United States Patent [19]

Jones

[11] Patent Number: 4,910,910

[45] Date of Patent: Mar. 27, 1990

[54] TIMBER INTERCONNECTOR

[76] Inventor: Jay E. Jones, P.O. Box 470, North Lima, Ohio 44452

[21] Appl. No.: 260,565

[22] Filed: Oct. 21, 1988

[51] Int. Cl.⁴ ............................................. A01G 1/00
[52] U.S. Cl. ........................................ 47/33; 52/102; 404/7
[58] Field of Search ...................... 47/33; 403/223, 50, 403/51, 300; 285/183, 226, 299; 52/102; 404/7

[56] References Cited

U.S. PATENT DOCUMENTS

| | | | |
|---|---|---|---|
| 500,119 | 6/1893 | Dieckmann | 285/183 |
| 3,259,405 | 7/1966 | Heller | 285/226 |
| 3,541,726 | 11/1970 | Raschke | 404/7 |
| 3,788,001 | 1/1974 | Balfanz | 47/33 |
| 4,765,775 | 8/1988 | Kroger | 52/102 |
| 4,810,008 | 3/1989 | Brodie | 285/226 |

FOREIGN PATENT DOCUMENTS 1422293 11/1964 France .................................... 47/33

Primary Examiner—Henry E. Raduazo
Attorney, Agent, or Firm—Harpman & Harpman

[57] ABSTRACT

A timber interconnector for coupling landscape timbers or the like to one another. The timber interconnector is a semi-flexible tubular configuration with an intermediary flexible body portion to accommodate different angular inclinations of joining abutting landscape timbers. The flexible link represents a substantial improvement over previously known connection treatments. Multiple shaped timber configurations can be achieved with a unified and cost effective installation.

4 Claims, 1 Drawing Sheet

U.S. Patent  Mar. 27, 1990  4,910,910 ical Field

This invention relates to flexible and fixed connectors used to join two adjacent bar-like timber elements together in multiple use configurations.

It has long been a problem of how to interlock the ends of landscape wood timbers or railroad ties so that they may be used as borders around planting beds or as unitary walls required in landscape projects to form a distinct transition between varied ground levels. Until now the timbers were sometimes drilled and long pins inserted through both to connect multiple ties, one on top of the other and also into the ground for vertical support. Due to the lack of adequate fastening system many practical uses for landscape timbers by the average users were beyond his or her ability. The lack of specialized tools and the time consuming nature of designing, engineering and fabricating a timber wall with multiple over-lapping timbers were prohibitive.

The object of this invention is to meet the long felt need for this type of device.

2. Description of Prior Art

Prior Art devices of this type in general have been directed away from the present problem. In U.S. Pat. No. 4,023,834, for example, a friction fit type coupling and conduit pipe assemble is disclosed having a flexible sleeve with a specified coefficient of friction fit to be placed over the adjacent ends of pipe to form a water type seal there-between without the use of adhesives or threaded couplings. The composition of the coupling is characterized as multiple layers of filaments arranged at right angles to one another to impart the desired flexibility and frictional grip required to maintain the seal.

U.S. Pat. No. 4,603,904 is directed towards a closure with a flexible spring bracket that is inserted into the respective free ends of a tubular chair back frame by fasteners. The connector is cross-sectionally solid with a multi-filament cable core.

Finally, in U.S. Pat. No. 3,545,128 a lawn edging system is disclosed wherein corner pieces are used to provide in angular directional change between adjacent wood ties. Each corner piece is secured by horizontally aligned pegs extending into the respective tie ends and the corner pieces. Vertically disposed pegs are used to interconnect ties to one another in stacking relation and also to achor same into the ground.

SUMMARY OF THE INVENTION

A timber interconnector to flexibly couple timbers to one another. Preshaped rigid end portions engage the timbers free ends. A flexible bellows like mid-portion extends between the ends imparting flexible angular connectors between the timber elements.

DESCRIPTION OF PREFERRED EMBODIMENT

Figure 1:
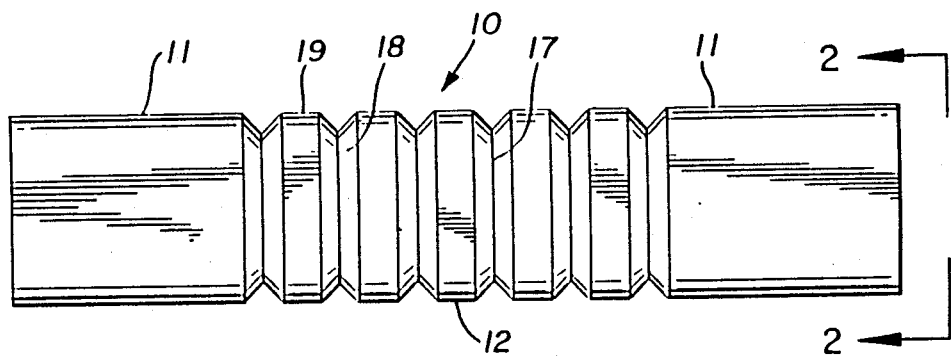
FIG. 1 is a side elevational view of the timber interconnector.
Figure 2:
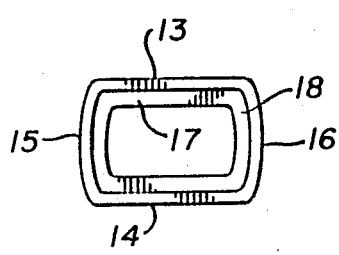
FIG. 2 is a sectional view on lines 2—2 of FIG. 1.
Figure 3:
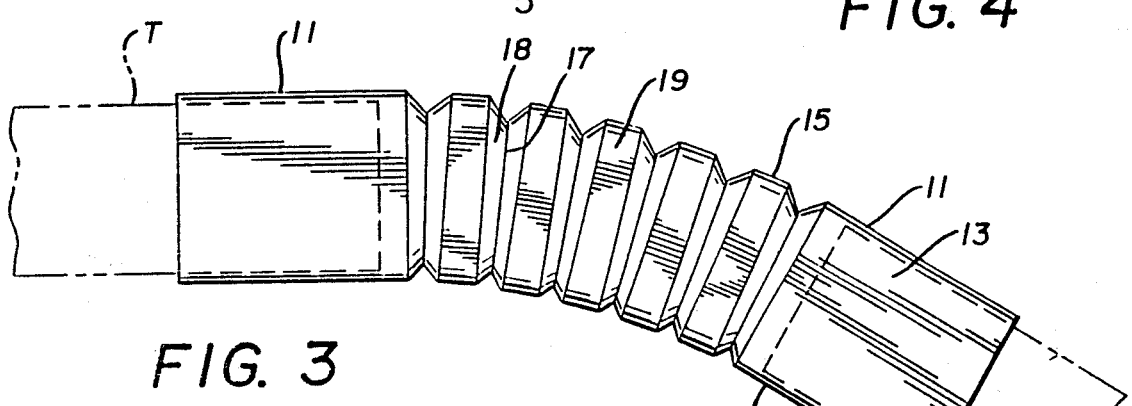
FIG. 3 is a top plan view with timber representations inserted into the interconnectors as in use.

Referring to FIGS. 1, 2, and 3 of the drawings a timber interconnector is disclosed having a main body member 10, a pair of oppositely disposed end portions 11 and a multi-segmented mid-portion 12. The main body member 10 is generally a cross-sectionally rectangular elongated tubular configuration having pairs of oppositely disposed walls 13, 14,15, and 16 arranged in right angular relation to one another. The walls 13–16 are of uniform thickness and in this embodiment chosen for illustration, the walls 15 and 16 are curved outwardly from a vertical plane extending between said walls 13 and 14. The walls 13 and 14 of the end portion 11 are flat and combined with walls 15 and 16 form a preshaped opening conforming to a landscape timber T shown in broken lines in FIG. 3 of the drawings.

The multi-segmented mid-portion 12 is comprised of a plurality of longitudinally spaced areas of decreased rectangular dimension at 17 from which extends an intermediate angularly disposed surface 18 to adjacent interspaced wall segments 19 of said walls 13–16.

The resulting construction defines the multi-segmented mid-portion 12 as being flexible from its longitudinal center axis A through varying degrees as seen in FIG. 3 of the drawings. This mutli-segmented mid-portion's 12 flexibility is derived from the alternate compression of the longitudinal distance between each of interspaced wall segments 19 along said wall 16, for example, in FIG. 3 of the drawings with corresponding expansion of the relative spacing between said wall segments 19 of said wall 15.

It will be seen that with the use of the timber interconnectors to connect timbers or the line in angular relation to one another that a variety of different enclosures or landscape borders can easily be achieved.

Figure 4:
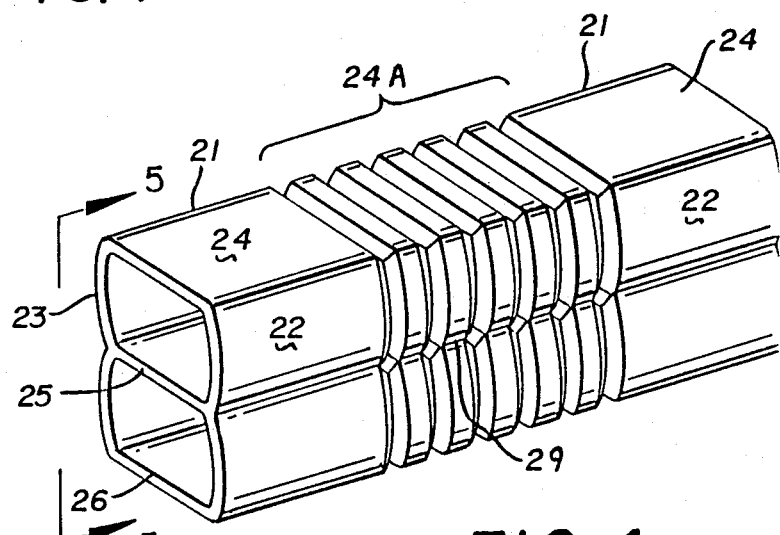
FIG. 4 is a perspective view of an alternate form of the invention.
Figure 5:
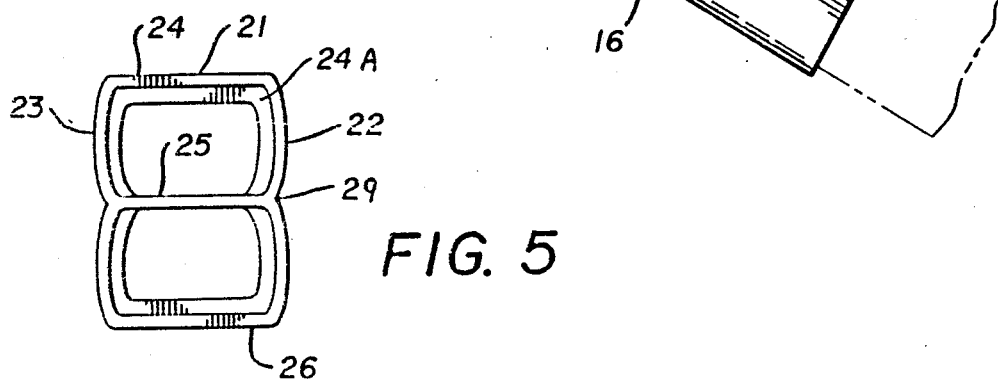
FIG. 5 is an end plan view on lines 5—5 of FIG. 4.

Referring now to FIGS. 4 and 5 of the drawings an alternate form of the invention can be seen wherein a double height interconnector 20 is shown having a pair of oppositely disposed double end portions 21. Each end portion 21 is made up of multiple side walls 22 and 23 and internally connecting longitudinally disposed walls 24,25, and 26. It will be noted that said wall 25 acts as a single intermediate divider within the end portion so that multiple timbers (not shown) can be inserted and secured separately within each of the end portions 21.

A double multi-segmented mid-portion 24A is disposed between said end portions 21 and is comprised of generally the same elements as that of said multi-segmented mid-portion 12 hereinbefore described. In the double multi-segmented mid-portion 24A, however, there is no single intermediary divider as in the double end portions 21. The multi-segmented side walls 27 and 28 are comprised of a pair of interconnected multi-segmented mid-portion walls that are interconnected along a line generally indicated at 29.

The timber interconnectors can also be of varied cross-sectional dimension to accomodate timbers of other dimensions, such as railroad ties or so called mini landscape timbers.

In the preferred embodiment the timer interconnectors have a transverse dimension greater than their respective height determined by the distance between the walls 13 and 14, as best seen in FIG. 2 of the drawings.

It will thus be seen that a new and novel timber interconnector has been illustrated and described and it will be evident to those skilled in the art that various changes and modifications may be made therein without departing from the spirit of the invention.

Therefore I claim:

1. A timber interconnector for securing adjacent ends of timbers comprising an elongated tubular body member having oppositely disposed end portions and a multi-segmented mid-portion, each of said end portions having a timber receiving multiple wall structure open to said multi-segmented mid-portion, said multiple wall structures having pairs of oppositely disposed walls in right angular relation to each other, one of said wall pairs being curved outwardly from a vertical plane, said mutli-segmented mid-portion comprised of pairs of multiple longitudinally spaced interconnected wall segments wherein one of said pairs of multiple wall segments has correspondingly outwardly curved surfaces matching that of said wall pair of adjoining end portion, an area of decreased cross-sectional dimension between each segment of said multiple segmented mid-portion, intermediary angularly disposed surfaces engaging said wall segments with said areas of decreased cross-sectional dimension therebetween.

2. A timber interconnector of claim 1 wherein said multi-wall structures are interconnecting and of a uniform wall thickness.

3. A timber interconnector of claim 1 wherein said timber interconnectors are comprised of synthetic resin material of a flexible nature.

4. A timber interconnector for securing multiple adjacent ends of landscaped timbers comprising an elongated tubular body member, having oppositely disposed multiple end portions and a multiple segmented mid-portion, each of said end portions has a multiple transverse extending integral walls, one of said walls positioned midway between said remaining of said walls, said multiple segmented mid-portion comprising a plurality of vertically stacked longitudinally spaced interconnecting wall segments, pairs of flexible intermediary compound angularly disposed surfaces engaging said wall segments with areas of decreased cross-sectional dimension therebetween.

* * * * *